(12) United States Patent
Montgomery et al.

(10) Patent No.: US 11,131,174 B2
(45) Date of Patent: Sep. 28, 2021

(54) HYDRAULIC FRACTURING SYSTEMS AND METHODS

(71) Applicant: BP Corporation North America Inc., Houston, TX (US)

(72) Inventors: Ryan Montgomery, Edmond, OK (US); Chris Hines, Arcadia, OK (US); Aaron Reyna, Oklahoma City, OK (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 343 days.

(21) Appl. No.: 15/868,809

(22) Filed: Jan. 11, 2018

(65) Prior Publication Data

US 2018/0202274 A1    Jul. 19, 2018

Related U.S. Application Data

(60) Provisional application No. 62/446,117, filed on Jan. 13, 2017.

(51) Int. Cl.
| | | |
|---|---|---|
| *E21B 43/26* | (2006.01) | |
| *E21B 33/134* | (2006.01) | |
| *E21B 47/06* | (2012.01) | |
| *C09K 8/62* | (2006.01) | |

(52) U.S. Cl.
CPC .............. *E21B 43/26* (2013.01); *C09K 8/62* (2013.01); *E21B 33/134* (2013.01); *E21B 47/06* (2013.01)

(58) Field of Classification Search
CPC ........ E21B 43/26; E21B 43/267; E21B 47/06; E21B 49/008; E21B 43/14
See application file for complete search history.

(56) References Cited

U.S. PATENT DOCUMENTS

| | | | |
|---|---|---|---|
| 3,933,205 A | 1/1976 | Kiel | |
| 5,295,539 A * | 3/1994 | Jennings, Jr. | ............ E21B 43/26 |
| | | | 166/297 |
| 6,776,235 B1 * | 8/2004 | England | ................ E21B 43/267 |
| | | | 166/271 |
| 2010/0051272 A1 * | 3/2010 | Loree | ........................ C09K 8/64 |
| | | | 166/279 |
| 2013/0233560 A1 | 9/2013 | Davidson | |

(Continued)

FOREIGN PATENT DOCUMENTS

| | | |
|---|---|---|
| CN | 105317417 A * | 2/2016 |
| WO | 2007/066254 | 6/2007 |

(Continued)

OTHER PUBLICATIONS

Wilke, Jim, et al., "Fracturing technique stimulates massive, fractured limestones," Oil and Gas Journal, Dec. 2, 1991, vol. 89, No. 48, pp. 58-61.

(Continued)

*Primary Examiner* — Zakiya W Bates
(74) *Attorney, Agent, or Firm* — Conley Rose, P.C.

(57) ABSTRACT

A method for stimulating a well extending through a subterranean formation includes (a) introducing a first fracturing fluid into the subterranean formation, and (b) introducing a second fracturing fluid into the subterranean formation that is different in composition from the first fracturing fluid, wherein the second fracturing fluid comprises a temporary diverting agent.

15 Claims, 5 Drawing Sheets

(56) References Cited

U.S. PATENT DOCUMENTS

| | | | |
|---|---|---|---|
| 2013/0284438 A1* | 10/2013 | Dusseault | E21B 43/267 166/280.1 |
| 2015/0053403 A1* | 2/2015 | Potapenko | C09K 8/80 166/280.2 |
| 2016/0177693 A1* | 6/2016 | Gomaa | C09K 8/62 166/250.07 |
| 2018/0202276 A1* | 7/2018 | Brannon | C09K 8/516 |

FOREIGN PATENT DOCUMENTS

| | | |
|---|---|---|
| WO | 2012/082962 | 6/2012 |
| WO | 2015/041690 | 3/2015 |
| WO | 2015/134022 | 9/2015 |

OTHER PUBLICATIONS

International Patent Application No. PCT/US2018/013791 Search Report dated Jul. 10, 2018.
Nelson, Emma J., "The Relationsnip Between Closure Pressures From Fluid Injection Tests and the Minimum Principal Stress in Strong Rocks", Science Direct—International Journal of Rock Mechanics & Mining Sciences, Feb. 7, 2007, vol. 44, pp. 787-801.

\* cited by examiner

HYDRAULIC FRACTURING SYSTEMS AND METHODS

CROSS-REFERENCE TO RELATED APPLICATIONS

This application claims priority to U.S. Provisional Patent Application No. 62/446,117, filed Jan. 13, 2017. The disclosure of which is hereby incorporated herein by reference in its entirety.

STATEMENT REGARDING FEDERALLY SPONSORED RESEARCH OR DEVELOPMENT

Not applicable.

BACKGROUND

Embodiments disclosed herein generally relate to wellbore completion operations. More particularly, embodiments disclosed herein relate to methods for stimulating wells by forming one or more hydraulic fractures in a subterranean formation through which the well extends.

A variety of methods are utilized to overcome limitations in fluid conductivity or permeability in subterranean formations through which a drilled well or wellbore extends. In some applications, a well stimulation or hydraulic fracturing system is employed to initiate and propagate hydraulic fractures in the subterranean formation extending from the wellbore in order to enhance fluid conductivity between the wellbore and the surrounding formation. For instance, a hydraulic fracturing fluid may be pumped down the wellbore against a desired location of the subterranean formation. The fluid is pressurized to a degree sufficient to initiate one or more fractures at the location along the formation. In some applications, the fracturing fluid includes proppant, such as sand, to prevent the hydraulic fracture from closing following the conclusion of the hydraulic fracturing operation.

BRIEF SUMMARY OF THE DISCLOSURE

An embodiment of a method for stimulating a well extending through a subterranean formation comprises (a) introducing a first fracturing fluid into the subterranean formation, and (b) introducing a second fracturing fluid into the subterranean formation that is different in composition from the first fracturing fluid, wherein the second fracturing fluid comprises a temporary diverting agent. In some embodiments, the first fracturing fluid comprises a permanent diverting agent, and the temporary diverting agent of the second fracturing fluid is configured to dissolve in-situ. In some embodiments, the method further comprises (c) introducing a third fracturing fluid into the subterranean formation that is different in composition from both the first fracturing fluid and the second fracturing fluid, wherein the third fracturing fluid comprises a temporary diverting agent. In certain embodiments, the second fracturing fluid comprises a near-field diverting agent, and the third fracturing fluid comprises a far-field diverting agent. In certain embodiments, the method further comprises (c) forming a primary fracture extending into the subterranean formation from a surface of the well in response to (a), and (d) forming a secondary fracture extending into the subterranean formation from the primary fracture formed in (c) in response to (b). In some embodiments, the method further comprises (c) shutting in the well for a first period of time following (a), (d) recording a first pressure parameter of the first fracturing fluid during (c), (e) shutting in the well for a second period of time following (b), (f) recording a second pressure parameter of the second fracturing fluid during (e), and (g) forming the composition of a third fracturing fluid in response to a difference between the first pressure parameter and the second pressure parameter.

An embodiment of a method for stimulating a well extending through a subterranean formation comprises (a) introducing a first fracturing fluid into the subterranean formation, (b) shutting in the well for a first period of time following (a), (c) recording a first pressure parameter of the first fracturing fluid during (b), (d) introducing a second fracturing fluid into the subterranean formation, (e) shutting in the well for a second period of time following (d), (f) recording a second pressure parameter of the second fracturing fluid during (e), and (g) forming a composition of a third fracturing fluid in response to the recorded first pressure parameter and second pressure parameter. In some embodiments, the first pressure parameter comprises an instantaneous shut-in pressure (ISIP) of the first fracturing fluid, and the second pressure parameter comprises an ISIP of the second fracturing fluid. In some embodiments, the first pressure parameter comprises a net pressure of the first fracturing fluid corresponding to the difference between an instantaneous shut-in pressure (ISIP) of the first fracturing fluid and in-situ stress of the subterranean formation, and the second pressure parameter comprises a net pressure of the second fracturing fluid corresponding to the difference between an ISIP of the second fracturing fluid and in-situ stress of the subterranean formation. In certain embodiments, the method further comprises (h) introducing the third fracturing fluid into the subterranean formation, (i) shutting in the well for a third period of time following (h), (j) recording a third pressure parameter of the third fracturing fluid during (i), and (n) forming a composition of a fourth fracturing fluid in response to the recorded third pressure parameter and fourth pressure parameter. In certain embodiments, the method further comprises (h) including a temporary diverting agent in the composition of the third fracturing fluid in response to a difference between the first pressure parameter and the second pressure parameter. In some embodiments, the method further comprises (h) maintaining the same composition of the second fracturing fluid and first fracturing fluid in response to an equivalence between the first pressure parameter and the second pressure parameter. In some embodiments, the method further comprises (h) flowing back fluid from the well to a surface of the well following (b), and (i) flowing back fluid from the well to a surface of the well following (e).

An embodiment of a method for stimulating a well extending through a subterranean formation comprises (a) introducing a first fracturing fluid into the subterranean formation, (b) shutting in the well for a first period of time following (a), (c) flowing back fluid from the well to a surface of the well following (b), (d) introducing a second fracturing fluid into the subterranean formation following (c), (e) shutting in the well for a second period of time following (d), and (f) flowing back fluid from the well to a surface of the well following (e). In some embodiments, the second fracturing fluid comprises a temporary diverting agent not included in the first fracturing fluid. In some embodiments, the method further comprises (g) monitoring the volume of fluid flowed back to the surface of the well during (c), and (h) monitoring the volume of fluid flowed back to the surface of the well during (f). In certain embodiments, the method further comprises (g) monitoring a pressure of the first fracturing fluid during (b), and (h) monitoring a pressure of the second fracturing fluid during (e). In certain embodiments, the method further comprises (g) forming a primary fracture in the subterranean formation extending from a surface of the well during (a), (h) forming spalling on a fracture face of the primary fracture during (c), and (i) bridging off the primary fracture during (d) with a temporary diverting agent included in the second fracturing fluid. In some embodiments, the method further comprises (g) recording a first pressure parameter of the first fracturing fluid during (b), (h) recording a second pressure parameter of the second fracturing fluid during (e), and (i) adjusting a composition of a third fracturing fluid in response to a difference between the recorded first pressure parameter and second pressure parameter. In some embodiments, the first pressure parameter comprises an instantaneous shut-in pressure (ISIP) of the first fracturing fluid, and the second pressure parameter comprises an ISIP of the second fracturing fluid.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF EXEMPLARY EMBODIMENTS

Figure 1:
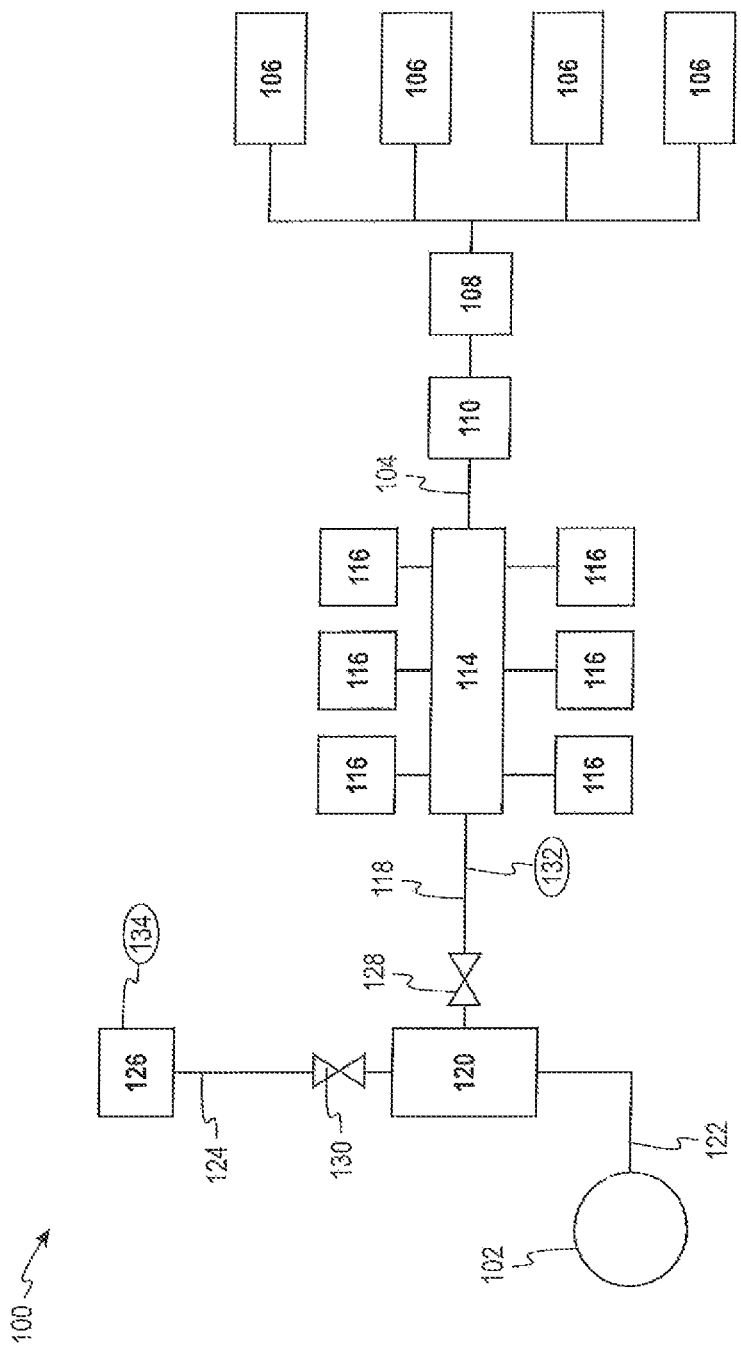
FIG. 1 is a schematic view of an embodiment of a well stimulation system in accordance with principles disclosed herein.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

Figure 2:
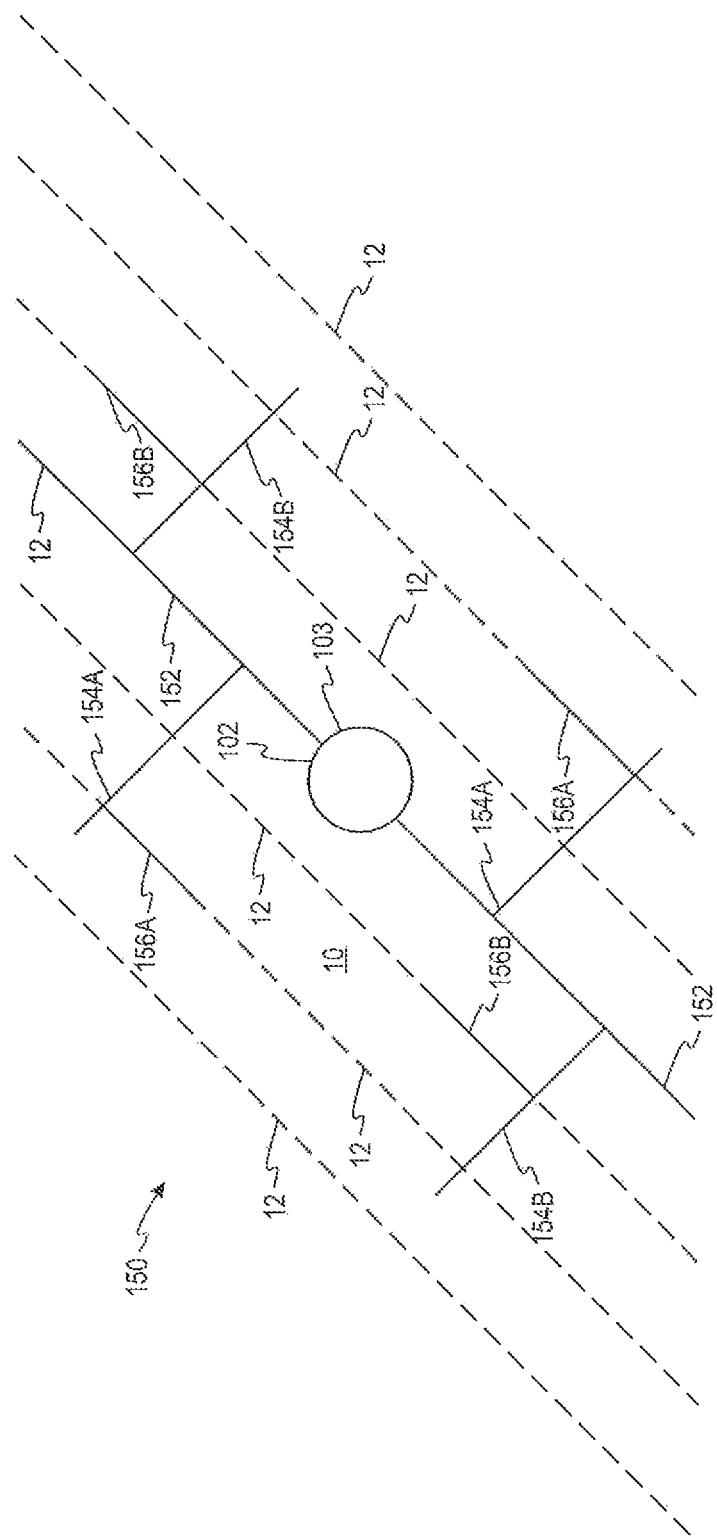
FIG. 2 is a schematic view of an embodiment of a dendritic fracture system in accordance with principles disclosed herein.

Referring now to FIGS. 1 and 2, an embodiment of a well stimulation or hydraulic fracturing system 100 is shown. Fracturing system 100 is generally configured to enhance fluid communication or connectivity between a wellbore or well 102 and a hydrocarbon bearing reservoir disposed in a subterranean earthen formation 10 (shown in FIG. 2) through which the well 102 extends. As will be discussed in more detail below, fracturing system 100 is used to initiate and propagate fractures in the subterranean formation 10 extending from well 102 in response to the communication of pressurized hydraulic fracturing fluids into well 102. Such fractures in formation 10 increase fluid connectivity between the well 102 and the targeted subterranean reservoir within formation 10. In other words, fracturing system 100 is employed to perform well stimulation or hydraulic fracturing operations, and in particular, fracturing operations designed to increase the complexity of fractures formed to further enhance fluid connectivity between the well 102 and the targeted reservoir within formation 10.

In the embodiment shown in FIGS. 1 and 2, fracturing system 100 generally includes a fracturing fluid supply conduit or manifold 104, a plurality of fluid storage tanks 106, a hydration unit 108, a blending unit 110, a fracturing manifold 114, a plurality of high pressure pumps 116, a high pressure fracturing line 118, a frac tree 120 including a flow cross, a wellhead 122, a flowback line 124, and a flowback tank 126. Storage tanks 106 and units 108 and 110 are in series fluid communication with conduit 104. In the embodiment shown in FIG. 1, fluid storage tanks 106 store a base fluid (e.g., water) that is routed through the hydration unit 108 where gelling agents are added. After sufficient hydration time to allow for adequate mixing in hydration unit 108, the fluid travels to blending unit 110 and is blended with predetermined quantities of chemicals (e.g., acids, surfactants, gels, emulsifiers, etc.) and/or diverting agents provided by blending unit 110. In the embodiment shown in FIG. 1, blending unit 110 can supply hydraulic fracturing system 100 with both a permanent or non-dissolvable/non-biodegradable diverting agent, such as proppant (e.g., sand, etc.), and temporary or biodegradable/dissolvable diverting agents to degrade or dissolve in-situ (i.e., within the subterranean formation 10 following injection therein) after a predetermined period of time. As used herein, the term "temporary diverting agent" is defined a diverting agent designed to break down and dissolve under in-situ well conditions, thereby leaving perforations and fractures open.

The time required for breaking down the temporary diverting agent may vary depending on fluid and reservoir properties, but in this embodiment, occurs approximately in 24 to 72 hours. In general, any suitable permanent or non-dissolvable/non-biodegradable diverting agent(s), temporary or biodegradable/dissolvable diverting agent(s), or combinations thereof can be stored and supplied by blending unit 110. Examples of suitable permanent diverting agents include, without limitation, 100 mesh proppant, walnut hulls, large grain size proppants (e.g., 8-16 to 40-70 mesh proppants), or any other particulate which remains in the reservoir; and examples of suitable temporary diverting agents include, without limitation, Polylactic Acid, Benzoic Acid Flake particulate, rock salt, and calcium carbonate pellets of varying mesh sizes Both the permanent and temporary diverting agent(s) provided by blending unit 110 are designed to assist in preventing fracturing fluid from leaking into the subterranean formation 10 from a fracture formed therein, and, as will be discussed further herein, to assist in screening out or bridging previously formed hydraulic fractures to thereby form new secondary or tertiary hydraulic fractures extending therefrom to form a dendritic fracture system in the formation 10. Although blending unit 110 is described as storing and supplying temporary or biodegradable/dissolvable diverting agents to degrade or dissolve in-situ after a predetermined period of time, in other embodiments, the diverting agent(s) supplied by blending unit 110 may dissolve in-situ in response to changes in temperature, salinity, pH, or other parameters.

Referring still to FIGS. 1 and 2, the blended well stimulation or hydraulic fracturing fluid provided by blending unit 110 is supplied to fracturing manifold 114, where the fracturing fluid is routed through the plurality of pumps 116 to pressurize the fracturing fluid to a fracturing pressure sufficient to initiate or form one or more fractures in the subterranean formation 10 through which the well 102 extends. In this embodiment, each pump 116 comprises a positive displacement pump powered by a power source such as a diesel engine, a gas turbine, or other devices known in the art. Accordingly, shutting down or de-energizing the power source of each pump 116 holds each pump 116 stationary such that back pressure may be held within the well 102.

Following pressurization via pumps 116, the fracturing fluid is routed from manifold 114 through high pressure fracturing line 118 into frac tree 120. Thus, high pressure fracturing line 118 extends between and provides fluid communication between manifold 114 and frac tree 120. Frac tree 120 manages the flow and communication of fluid between well 102 and the components (e.g., high pressure fracturing line 118, flowback line 124, etc.) of hydraulic fracturing system 100. In the embodiment shown in FIGS. 1 and 2, frac tree 120 comprises a flow cross and is coupled with high pressure fracturing line 118, flowback line 124, and wellhead 122. Fluid communication between frac tree 120 and well 102 is provided by wellhead 122 disposed at the upper end of well 102 (at the surface). Wellhead 122 provides physical support for frac tree 120 as well as components of fracturing system 100 that extend into well 102, including a casing string (not shown in FIG. 1). The casing string provide structural support to well 102 and controls fluid communication between well 102 and the surrounding subterranean formation 10 through which well 102 extends. Although well 102 is a cased well in this embodiment, in general, system 100 can be used in connection with cased or uncased wells.

In the arrangement described above and shown in FIGS. 1 and 2, pressurized fracturing fluid is communicated from high pressure fracturing line 118, through frac tree 120, and into well 102 via wellhead 122. As will be discussed further herein, hydraulic fracturing system 100 also receives and routes flowback fluid from well 102 following the injection of pressurized fracturing fluid into well 102. Particularly, flowback fluid from well 102 is routed through wellhead 122, frac tree 120, and into flowback tank 126 via flowback line 124 for storage in tank 126. In the embodiment shown in FIGS. 1 and 2, frac tree 120 includes a frac valve 128 for isolating high pressure fracturing line 118 when flowback fluid is flowed from well 102 into flowback tank 126 via flowback line 124. Additionally, frac tree 120 includes a flowback valve 130 for isolating flowback tank 126 when high pressure fracturing fluid is pumped into well 102 from high pressure fracturing line 118.

Referring still to FIGS. 1 and 2, high pressure fracturing line 118 includes a pressure sensor 132 to measure and indicate fluid pressure within high pressure fracturing line 118. However, in other embodiments, the pressure of pressurized fracturing fluid pumped into well 102 may be measured at other locations in fracturing system 100. Fluid flow rate of pressurized fracturing fluid through high pressure fracturing line 118 is determined by parameters pertaining to pumps 116 (i.e., speed, amount of fluid displaced each period, etc.), via a dedicated instrument for measuring flow rate through line 118, or via a discharge flow coupled to the blending unit 110. Still further, flowback tank 126 includes a level sensor 134 for measuring and indicating a fluid level in flowback tank 126, where the change in fluid level in tank 126 over time may be used to determine the flow rate of flowback fluid flowing into flowback tank 126 from flowback line 124. However, in other embodiments, changes in fluid level in flowback tank 126 may be measured visually, or, alternatively, flowback line 124 may include a flow meter sensor for measuring the rate of fluid flow therein.

Hydraulic fracturing system 100 shown in FIG. 1 is employed via methods discussed further herein to form a dendritic fracture system 150, as shown schematically in FIG. 2. Particularly, FIG. 2 schematically illustrates a horizontally extending, subsurface portion of well 102 and the surrounding subterranean formation 10 through which well 102 extends. Although in this embodiment well 102 of hydraulic fracturing system 100 includes a horizontal or deviated section, in other embodiments, well 102 may comprise a substantially vertical well.

As shown in FIG. 2, subterranean formation 10 includes a series of substantially parallel natural joints 12 forming a natural joint system extending through formation 10. Natural joints 12 generally comprise cemented cracks formed in the rock matrix comprising formation 10 over geologic time, where natural joints 12 extend through formation 10 in the same general direction. Natural joints 12 may generally provide for greater fluid transmissibility or conductivity than the rock matrix forming subterranean formation 10. Although not shown in FIG. 2, subterranean formation 10 also includes a secondary joint system (natural joints 12 comprising the primary joint system of formation 10) extending generally perpendicular to natural joints 12.

As shown in FIG. 2, dendritic fracture system 150 generally includes a pair of primary fractures 152, a pair of near-field secondary fractures 154A, a pair of far-field secondary fractures 154B, a pair of near-field tertiary fractures 156A, and a pair of far-field tertiary fractures 156B. The primary fractures 152 of dendritic fracture system 150 extend from a generally cylindrical surface 153 of the well 152 in a bi-wing configuration. As will be discussed further herein, primary fractures 152 generally comprise the initial hydraulic (i.e., not natural) fractures formed in subterranean formation 10 during a well stimulation or hydraulic fracturing operation performed by the hydraulic fracturing system 100 shown in FIG. 1. In the embodiment shown in FIG. 2, primary fractures 152 of dendritic fracture system 150 extend along one of the natural joints 12 formed in subterranean formation 10, where the natural joint 12 presents a point of weakness in formation 10 that intersects the wall 103 of well 102, thereby allowing for the initiation and formation of primary fractures 152 therethrough.

In this arrangement, primary fractures 152 of dendritic fracture system 150 only intersect a single natural joint 12 of subterranean formation 10, limiting communication between primary fractures 152 and other natural joints 12 of formation 10, where natural joints 12 provide greater fluid transmissibility than the rock matrix forming formation 10. Due in at least part to this limited communication or connectivity between primary fractures 152 and multiple natural joints 12 of formation 10, fracture systems including only linear, primary fractures (i.e., non-dendritic fracture systems) may only provide a limited or temporary increase in hydrocarbon production following the hydraulic fracturing operation given that the formation of only primary fractures may only provide a limited increase in the drainage area of the well of the well system.

In FIG. 2, dendritic fracture system 150 includes secondary fractures (both near and far-field) 154A and 154B that extend at an angle from primary fractures 152. Particularly, secondary fractures 154A and 154B are shown extending perpendicularly from primary fractures 152; however, in other embodiments, secondary fractures 154A and 154B may extend from primary fractures 152 at varying angles. The branching of secondary fractures 154A and 154B from primary fractures 152 (instead of directly from the well 102) forms a dendritic fracture system, particularly, a double-wing dendritic fracture system. In this configuration, secondary fractures 154A and 154B cut across multiple natural joints 12 of subterranean formation 10, thereby establishing direct fluid communication between a plurality of natural joints 12 of formation 10 and the well 102 of hydraulic fracturing system 100. The intersection of secondary fractures 154A and 154B with multiple natural joints 12 of subterranean formation 10 substantially increases the drainage area of well 102 and thereby aids in the rapid recovery of fluids from the formation 10.

Dendritic fracture system 150 includes tertiary fractures (both near and far-field) 156A and 156B that extend at an angle from primary fractures 154A and 154B (i.e., near-field tertiary fracture 156A extending from near-field secondary fracture 154B, etc.). Tertiary fractures 156A and 156B are shown in FIG. 2 extending perpendicularly from secondary fractures 154A and 154B, respectively; however, in other embodiments, tertiary fractures 156A and 156B may extend from secondary fractures 154A and 154B at varying angles. Each tertiary fracture 156A and 156B of dendritic fracture system 150 extends along a different natural joint 12 of the subterranean formation 10, further enhancing fluid transmissibility and conductivity between the well 102 and formation fluid disposed in formation 10. In this arrangement, tertiary fractures 156A and 156B further increase the drainage area of well 102, and the complexity and cluster efficiency (i.e., efficiency of the hydraulic fractures of the fracture system in contributing to hydrocarbon production) of the dendritic fracture system 150.

In the embodiment shown in FIG. 2, dendritic fracture system 150 includes both near-field secondary and tertiary fractures 154A and 156A, respectively, and far-field secondary and tertiary fractures 154B and 156B, respectively, where near-field fractures 154A and 156A are disposed in greater proximity with well 102 than corresponding far-field fractures 154B and 156B, which are disposed at a relatively greater distance from well 102. Without being limited by this or any particular theory, and as will be discussed further herein, the formation of near-field (e.g., fractures 154A and 156A) and far-field (e.g., fractures 154B and 156B) in the subterranean formation 10 is generally contingent on the mesh size of the diverting agent provided by blending unit 110 to the fracturing fluid that is pumped into the formation 10—a fracturing fluid including diverting agents having a relatively larger mesh size is used to plug off primary fractures 152, and thereby transfer energy to create near-field fractures 154A and 154B in formation 10 at or near well 102, while fracturing fluid including diverting agents having a relatively smaller mesh size is used to plug off near field fractures 154A and 154B, thereby transferring energy to create far-field fractures 156A and 156B in formation 10 distal well 102. Further, although dendritic fracture system 150, formed via hydraulic fracturing operations performed by hydraulic fracturing system 100, is shown in FIG. 2 as comprising two primary fractures 152 in a bi-wing arrangement, with each primary fracture 152 including a pair of secondary fractures 154A, 154B, and a pair of tertiary fractures 156A, 156B, in other embodiments, the dendritic fracture system 150 formed by hydraulic fracturing system 100 may comprise varying numbers of primary fractures 152, secondary fractures (both near-field and far-field) 154A and 154B, and tertiary fractures (both near-field and far-field) 156A and 156B.

Figure 3:
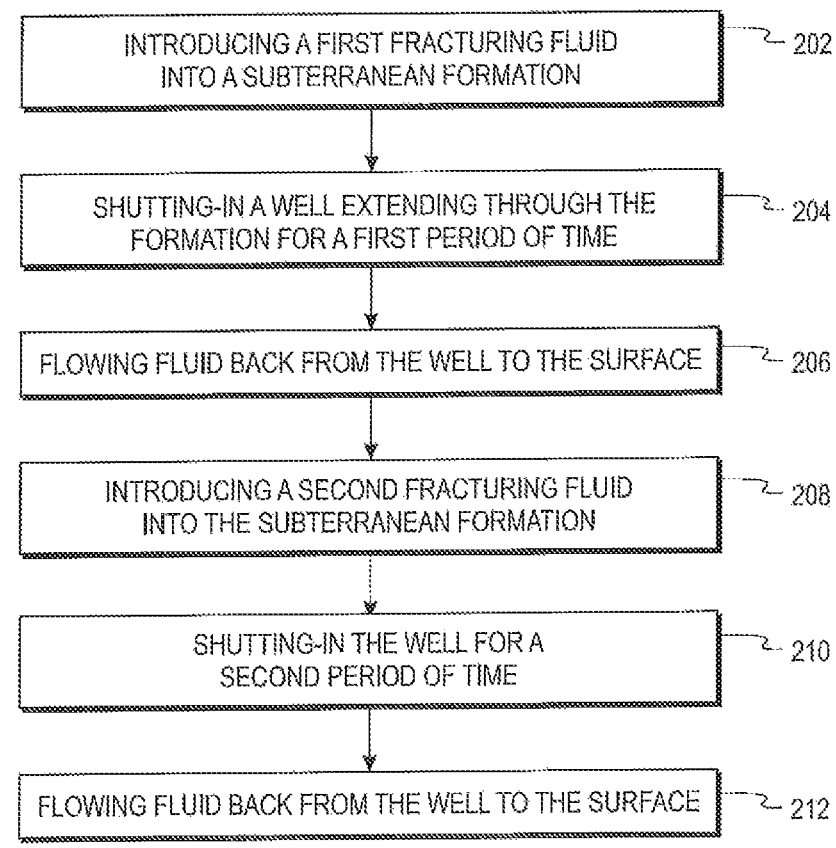
FIG. 3 is a flow chart illustrating an embodiment of a well stimulation method in accordance with principles disclosed herein.

Referring now to FIG. 3, an embodiment of a method 200 for stimulating a well extending through a subterranean formation is shown. For convenience, the method 200 is described below as being performed via the hydraulic fracturing system 100 shown in FIG. 1; however, method 200 may be employed using a variety of well stimulation or hydraulic fracturing systems that vary substantially from hydraulic fracturing system 100. Additionally, for clarity, method 200 is described below in conjunction with the pressure and flow rate graph of FIG. 4 and the Nolte-Smith plot of FIG. 5. However, the data presented in FIGS. 4 and 5 are merely examples used for illustrative purposes, and actual surface pressure, flow rate, and net pressure data obtained during the performance of method 200 may vary substantially from the data presented in FIGS. 4 and 5.

Figure 4:
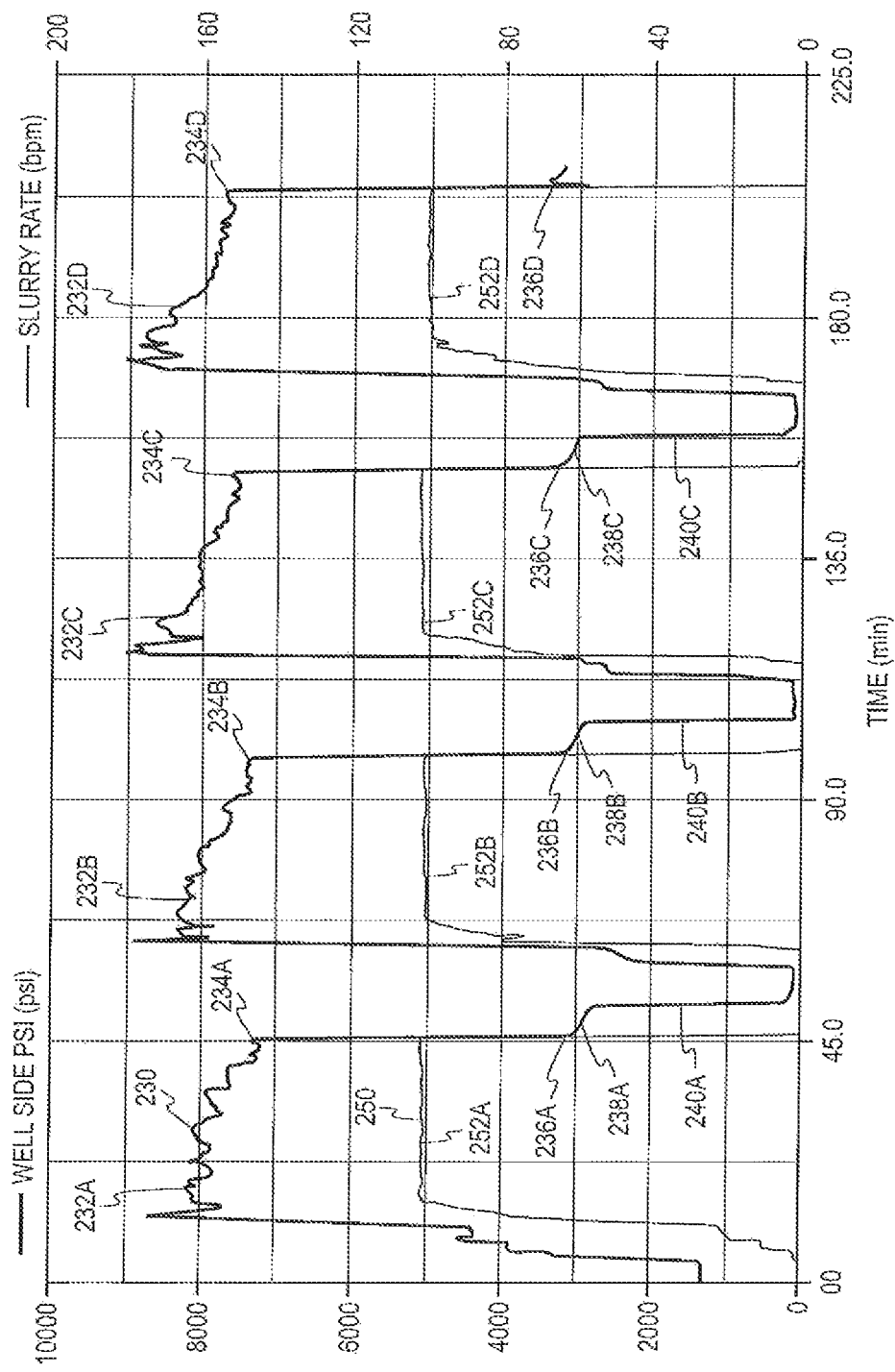
FIG. 4 is a graph illustrating an embodiment of surface pressure and flow rate data obtained during the performance of the well stimulation method of FIG. 3.
Figure 5:
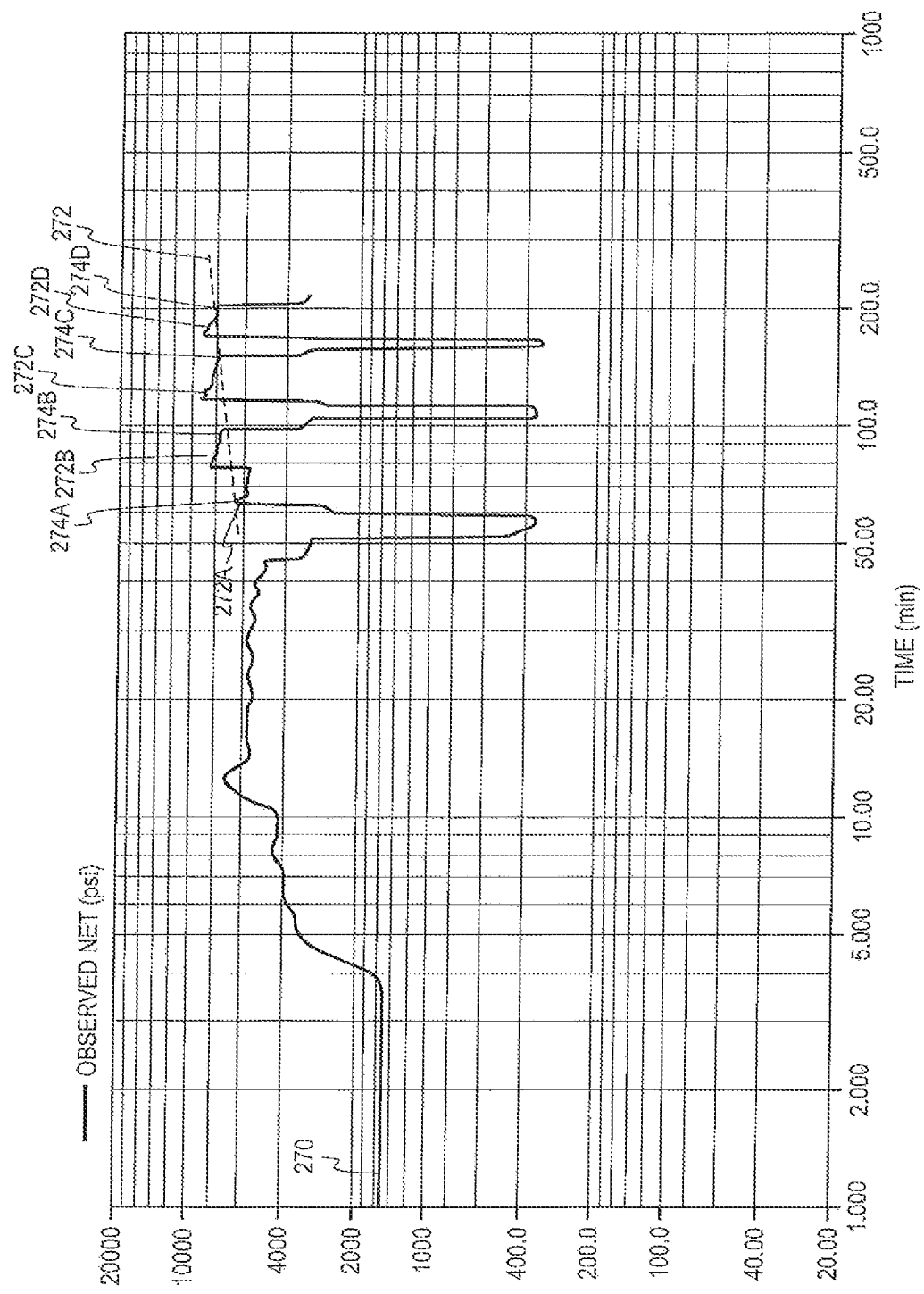
FIG. 5 is a Nolte-Smith plot illustrating an embodiment of net pressure data obtained during the performance of the well stimulation method of FIG. 3.

Referring briefly to FIG. 4, the surface pressure 230 is expressed in pounds per square inch (PSI) (left-hand Y-axis) and the flow rate 250 are expressed in barrels per minute (BPM) (right-hand Y-axis) in high pressure fracturing line 118 during an illustrative performance of method 200 (elapsed time shown in minutes on the X-axis). As will be discussed further herein, surface pressure 230 of FIG. 4 includes four pumping cycles or periods 232A-232D that correspond with four fluid flow cycles or periods 252A-252D of flow rate 250. Each pumping period 232A-232D of surface pressure 230 is terminated by a pumping cessation event 234A-234D at which point pumping (i.e., the operation of pumps 116 shown in FIG. 1) is ceased and fluid flow into well 102 begins to rapidly decline (although not instantaneously due to momentum of the flowing fluid). Surface pressure 230 shown in FIG. 4 additionally includes three shut-in cycles or periods 238A-238C where the flow rate 250 of fracturing fluid into well 102 is at or near zero.

Each shut-in period 238A begins or is marked by an instantaneous shut-in pressure (ISIP) 238A-238C that corresponds to the moment that fluid flow into well 102 approaches or reaches zero following the preceding pumping cessation event 234A-234C. Although the surface pressure 230 shown in FIG. 4 does not include a fourth shut-in period, surface pressure 230 does include a fourth ISIP 236D following fourth pumping cessation event 234D. The shutting-in or trapping of fluid within well 102 that occurs during each shut-in period 238A-238C can be accomplished by ceasing the operation of pumps 116 shown in FIG. 1 while keeping the flowback valve 130 closed to restrict fluid in well 102 from venting into flowback tank 126.

Referring still to FIG. 4, surface pressure 230 includes three flowback cycles or periods 240A-240C where the flow rate 250 of fracturing fluid into well 102 is reversed (not shown in FIG. 4) with flowback fluids flowing into well 102 from the formation 10, and from the well 102 into the flowback tank 126 shown in FIG. 1. Flowback can be accomplished in each flowback period 240A-240C by opening flowback valve 130 to allow fluid trapped in well 102 during each preceding shut-in period 238A-238C to vent into flowback tank 126. As indicated in FIG. 4, surface pressure 230 generally rises during each pumping period 232A-232D where pressurized fracturing fluid is pumped into well 102 via pumps 116 shown in FIG. 1, declines slightly during each shut-in period 238A-238C, and declines substantially during each flowback period 240A. Additionally, surface pressure 230 declines sharply in the relatively brief period between each pumping cessation event 234A-234D and subsequent ISIP 236A-236D, corresponding to the reduction or elimination of friction on the fracturing fluid as its flow rate approaches or reaches zero.

FIG. 5 is a log chart (both X and Y axes are on log scales) indicating net pressure 270 (fracture pressure minus the in-situ stress) in PSI during an illustrative performance of method 200 (elapsed time shown in minutes on the X-axis). Not intending to be bound by any theory, fracturing net pressure ($P_{net}$) is typically defined as shown in the following equation (1) that includes the following terms: fracture height ($H_o$), modulus (E), tip effects ($K_{Ic-app}$), pump rate (Q), fluid viscosity ($\mu$), and fracture length ($x_f$):

$$P_{net} \propto \left\{ \frac{E'^4}{H_o^4}\left(\frac{Q\mu x_f}{E'}\right) + \frac{K_{Ic-app}^4}{H_o^2} \right\}^{\frac{1}{4}}. \quad (1)$$

Not intending to be bound by any theory, the fracture pressure component of net pressure 270 shown in FIG. 5 includes bottomhole treating pressure (BHTP) minus the pressure drop in the fracture. BHTP comprises the sum of surface pressure (i.e., pressure measured at pressure sensor 132) and hydrostatic pressure (i.e., hydrostatic head in well 102 between the surface and the position of the fracture) minus pipe friction. The pressure drop in the fracture comprises the sum of perforation friction (i.e., friction within the fracture) and tortuosity (a measure of the geometric complexity of a porous medium). The in-situ stress component of the net pressure 270 shown in FIG. 5 corresponds to the minimum horizontal stress applied to the formation 10 proximal the fracture (e.g., primary fractures 152 of dendritic fracture system 150 shown in FIG. 2), which may be determined via a mini-frac or step-down test.

The net pressure 270 shown in FIG. 5 includes four pressurization cycles or periods 272A-272D that generally correspond in time with the pumping periods 232A-232D and ISIPs 236A-236D surface pressure 230 shown in FIG. 4. Each pressurization period 272A-272D of net pressure 270 concludes with a shut-in net pressure 274A-274D that occurs at the same point in time as the ISIPs 236A-236D of surface pressure 230 shown in FIG. 4. Each shut-in net pressure 274A-274D generally corresponds to the difference between the ISIP and in-situ stress at the fracture (e.g., shut-in net pressure 274A corresponds with ISIP 236A minus minimum horizontal stress at the fracture, etc.). As will be discussed further herein, a linear slope 272 may be charted through each shut-in net pressure 274A-274D to indicate formation of new fractures and/or enhanced fracture geometry and complexity in the subterranean formation 10 surrounding well 102.

Referring now to FIG. 3, method 200 begins at block 202 where a first fracturing fluid is introduced into a subterranean formation as part of a first pressure pulse period. In this embodiment, block 202 of method 200 includes: (a) forming a composition of a first fracturing fluid using fluid storage tanks 106, chemical unit 108, and blending unit 110; (b) pressurizing the formed first fracturing fluid to a pressure sufficient to hydraulically fracture subterranean formation 10 using pumps 116; (c) pumping the pressurized first fracturing fluid into and through the well 102 via high pressure fracturing line 118, frac tree 120, and wellhead 122; and (d) directing the pressurized first fracturing fluid against the wall 103 of the well 102 at a predetermined location of the well 102 (e.g., at a predetermined stage of a multi-stage fracturing operation, etc.). It should be appreciated that in other embodiments, the performance of block 202 of method 200 may vary from that described above and include fewer or additional steps.

As shown in FIG. 4, the surface pressure 230 of first fracturing fluid flowing through well 102 at block 202 of method 200 corresponds to the first pumping period 232A where surface pressure 230 is generally between 7,000-9,000 PSI over a time duration of approximately 30 minutes; however, in other embodiments, time durations of first pumping period 232A and surface pressures 230 obtained during block 202 may vary. In this embodiment, the first fracturing fluid pumped through well 102 at block 202 largely comprises a mixture of water and permanent diverting agents, such as proppant (e.g., sand, etc.), and does not include any temporary or biodegradable/dissolvable diverting agents. The permanent diverting agent or proppant included in the first fracturing fluid generally have a small mesh size (e.g., 40-70 to 100 mesh) and are of low concentration (e.g., 0 to 0.1 pounds per gallon) to mitigate potential packing issues and screen-out risks. The first pumping period 232A is generally configured to create bi-wing fractures 152 emanating from well 102, thereby initiating the dendritic process. It should be appreciated that in other embodiments or subterranean formations, the first pumping period proppant selection, size and utilization may vary greatly. Examples of suitable types of proppant that may be used in the first pumping period 232A include, without limitation, naturally occurring proppant (e.g., sand) and/or manmade proppants such as ceramic or aluminum oxide, depending on the properties of the reservoir; however, in other embodiments, the composition of the first fracturing fluid pumped at block 202 may vary. For instance, in other embodiments, the first fracturing fluid employed at block 202 of method 200 may only include biodegradable or dissolvable diverting agents in lieu of the permanent diverting agents; in still other embodiments, the first fracturing fluid may contain no diverting agents at all and consist entirely of fluid. The first fracturing fluid pumped into formation 10 initiates and forms the primary fractures 152 shown in FIG. 2 (secondary fractures 154A and 154B and tertiary fractures 156A and 156B have not yet formed). Permanent diverting agents in the first fracturing fluid penetrating primary fractures 152 props up or prevents fractures 152 from fully closing or screening out at the wall 103 of well 102 and minimizes fluid loss to the formation 10 by temporarily sealing or screening out leak paths that interface with the fracture face of primary fractures 152 (i.e., the inner surfaces of primary fractures 152), such as secondary natural joints formed in the subterranean formation 10.

Referring again to FIG. 3, at block 204 of method 200, a well extending through the subterranean formation is shut-in for a first period of time. In this embodiment, pumps 116 shown in FIG. 1 cease pumping and lock in or trap the previously pumped first fracturing fluid in the well 102 and primary fractures 152 formed in the subterranean formation 10. As shown in FIG. 4, surface pressure 230 obtained during block 204 of method 200 corresponds to the period between the first pumping cessation event 234A and the end of the first shut-in period 238A. Surface pressure 230 declines from over 7,000 PSI at the first pumping cessation event 234A to approximately 3,000 PSI at the first ISIP 236A where fluid flow rate in the well 102 is at or near zero; although, in other embodiments, surface pressure 230 obtained at block 204 may vary. The first ISIP 236A is recorded and surface pressure 230 is monitored in five minute increments over the duration of the first shut-in period 238A, which lasts for between approximately five to fifteen minutes, although time durations and monitoring intervals may vary in other embodiments. Additionally, the first shut-in net pressure 274A (illustrated in FIG. 5) is recorded.

The cessation of pumping during the first shut-in period 238A that occurs at block 204 of method 200 reduces the fluid pressure at the fracture face of primary fractures 152, thereby causing the formation of spalls or splinters at the fracture face of primary fractures 152. Due to the lack of fluid velocity in well 102 and primary fractures 152 during the first shut-in period 238A of block 204, the spalls formed in primary fractures 152 remain in place at the fracture face over the duration of the first shut-in period 238A.

Moving now to block 206 of method 200 in FIG. 3, fluid is flowed back from the well to the surface. In this embodiment, flowback valve 130 shown in FIG. 1 is opened, allowing fluid disposed in well 102 and/or the primary fractures 152 extending into formation 10 to flow through wellhead 122 disposed at the surface of well 102 and frac tree 120, and into flowback tank 126 via flowback line 124. The rate and total volume of flowback fluid inputted to flowback tank 126 is actively monitored at tank 134 via level sensor 134. By measuring the rate of change in the level of tank 134, the velocity generated by the flowback fluid may be measured, where larger flowback velocity aids in formation of formation spalls or splinters in the dendritic fracture network 150. In this embodiment, the flowback velocity of fluid entering tank 134 may range approximately between 50 to 20 barrels per minute, but flowback velocities may vary depending on the application. As shown in FIG. 4, surface pressure 230 obtained during block 206 of method 200 corresponds to the first flowback period 240A, where surface pressure 230 declines rapidly from approximately 2,900 PSI to near zero or atmospheric, with the duration of first flowback period 240A of block 206 comprising approximately five to fifteen minutes, although, in other embodiments, time durations of block 206 and pressures obtained during the first flowback period 240A may vary. The reverse or flowback flow obtained at block 206 increases spall generation within primary fractures 152 in subterranean formation 10 as reverse flow through primary fractures 152 results in a greater rate of pressure change, and in-turn, an increased pressure differential between primary fractures 152 and the rock matrix forming formation 10. The increased pressure differential between primary fractures 152 and the rock matrix forming subterranean formation 10 results in higher stresses applied to the fracture faces of primary fractures 152, thereby inducing the increased spalling and formation of debris in primary fractures 152.

Referring again to FIG. 3, at block 208 of method 200, a second fracturing pressure pulse period is introduced into the subterranean formation as part of a second pressure pulse period. In this embodiment, block 208 includes steps similar to those discussed above with respect to block 202, except that the composition of the first fracturing fluid pumped into the well 102 at block 202 is adjusted to substitute the permanent diverting agents used at block 202 with a temporary or biodegradable/dissolvable diverting agent supplied by the blending unit 110 shown in FIG. 1; however, in other embodiments, the second fracturing fluid employed at the second pressure pulse period of block 208 of method 200 may include both permanent diverting agents, such as proppant, and the biodegradable diverting agent. Particularly, at block 208 of method 200 the second fracturing fluid of the second pressure pulse period pumped into well 102 and the subterranean formation 10 includes a near-field biodegradable diverting agent configured to produce near-field secondary, and possibly, tertiary fractures in formation 10, such as near-field secondary fractures 154A and near-field tertiary fractures 156A of the dendritic fracture system 150 shown in FIG. 2. In this embodiment, the near-field biodegradable diverting agent comprises a mesh size of between approximately 16-30 to 20-40 mesh; however, the mesh size of the near-field biodegradable diverting agent may vary depending on the application and the properties of the subterranean formation. Permanent diverting agents or proppant, such as sand, do not dissolve in-situ within the formation 10 like the biodegradable diverting agents, and thus, following the hydraulic fracturing of formation 10, are retrieved or produce from the well 102 during the subsequent production phase. Produced permanent diverting agents may damage production equipment through which the permanent diverting agent flows, increasing the costs of producing hydrocarbons from well 102. Conversely, biodegradable or dissolvable diverting agents are configured to degrade or dissolve in the formation 10 prior to the production phase, and thus, are not produced in solid form from the formation 10 during production.

As shown in FIG. 4, the surface pressure 230 of second fracturing fluid flowing through well 102 at block 208 of method 200 corresponds to the second pumping period 232B where surface pressure 230 is generally between 7,000-9,000 PSI over a time duration of approximately 30 minutes; however, in other embodiments, time durations of block 208 and surface pressure 230 obtained during the first pumping period 232A may vary. As the second fracturing fluid is introduced into the primary fractures 152 in subterranean formation 10 formed at block 202 of method 200, the spalls and other debris formed at blocks 204 and/or 206, as well as the near-field diverting agent included in the second fracturing fluid, screen out or bridge primary fractures 152 near the wall 103 of well 102 (i.e., in the near-field area surrounding well 102). The bridging of primary fractures 152 increases fluid pressure within fractures 152 during second pumping period 232B, forcing the initiation of one or more near-field secondary fractures 154A within primary fractures 152, with the new or secondary fractures oriented at an angle (perpendicular in the embodiment shown in FIG. 2, but the angles of the secondary fractures relative the primary fractures 152 may vary) relative primary fractures 152 given that the rock matrix forming formation 10 is stressed perpendicular to the direction of primary fractures 152.

Referring yet again to FIG. 3, at block 210 of method 200, the well is shut-in for a second period of time. In this embodiment, pumps 116 shown in FIG. 1 cease pumping and lock in or trap the previously pumped second fracturing fluid in the well 102 and the primary fractures 152 and near-field secondary fractures 154A (and near-field tertiary fractures 156A, if formed) are formed in the subterranean formation 10 as shown in FIG. 2. As shown in FIG. 4, surface pressure 230 obtained during block 210 of method 200 corresponds to the period between the second pumping cessation event 234B and the end of the second shut-in period 238B. Surface pressure 230 declines from over 7,000 PSI at the second pumping cessation event 234B to a pressure near but above 3,000 PSI at the second ISIP 236B where fluid flow rate in the well 102 is at or near zero; although, in other embodiments, surface pressure 230 obtained at block 210 may vary.

At block 210 of method 200, the second ISIP 236B is recorded and surface pressure 230 is monitored in five minute increments over the duration of the second shut-in period 238B (FIG. 4), which lasts for between approximately five to fifteen minutes, although time durations and monitoring intervals may vary in other embodiments. Additionally, the second shut-in net pressure 274B (illustrated in FIG. 5) is recorded. Further, the second ISIP 236B and second shut-in net pressure 274B obtained at block 210 are compared with the first ISIP 236A and first shut-in net pressure 274A, respectively, to determine the effects of the second pumping period 232B of block 208. Particularly, a substantial increase between the first and second ISIPs 236A and 236B and a positive slope 272 between shut-in net pressures 274A and 274B (e.g., a stair-step increase between net pressures 274A and 274B) indicate or at least suggest a change in the fracture geometry resulting from the operations performed at block 208, such as the initiation and formation of near-field secondary fractures 154A, and possibly, near-field tertiary fractures 156A. However, in other embodiments where only a slight increase (or zero increase) from first ISIP 236A to second ISIP 236B, and a flat slope 272 between net pressures 274A and 274B occurs, then the fracture geometry has not changed, with any difference between ISIPs 236A and 236B and net pressures 274A and 274B possibly being a result of an increase in the size of primary fractures 152. As used herein, the term "slight increase" in ISIP refers to an increase between approximately 0-10% while the term "substantial increase" in ISIP refers to an increase between approximately 10-25%, however, the relative increase in ISIP may vary depending on the application and the properties of the reservoir. Increasing ISIPs indicates changing stress profiles downhole by nature increasing net pressure. Additionally, net pressure analysis provides a quantitative measurement of fracture geometry. Approximately anything above a flat or zero slope to ¼ positive slope 272 in net pressure indicates increased fracture complexity and geometry when coupled with the stair-stepped dendritic process the subterranean formation has succumbed to. Slope 272 as illustrated on FIG. 5 takes into account the 'stair-step' process derived from the dendritic nature. Conversely, a flat slope 272 indicates an increase in the length of the existing fractures (i.e., primary fractures 152), not an increase in fracture complexity.

Additionally, the cessation of pumping at block 210 of method 200 reduces the fluid pressure at the fracture face of primary fractures 152 and near-field secondary fractures 154A (and near-field tertiary fractures 156A, if formed) (FIG. 2), causing the formation of spalls or splinters at the fracture face of fractures 152 and 154A. Due to the lack of fluid velocity in well 102 and fractures 152 and 154A during the second shut-in period 238B of block 204 (FIG. 4), the spalls formed in fractures 152 and 154A remain in place at the fracture face over the duration of the second shut-in period 238B.

Referring again to FIG. 3, at block 212 of method 200, fluid is flowed back from the well to the surface. In this embodiment, and similar to the operation of hydraulic fracturing system 100 at block 206, at block 212, flowback valve 130 shown in FIG. 1 is opened, allowing fluid disposed in well 102 and/or the fractures 152, 154A (and 156A, if formed) extending into formation 10 to flow through frac tree 120, and into flowback tank 126 via flowback line 124. The rate and total volume of flowback fluid inputted to flowback tank 126 is actively monitored at tank 134 via level sensor 134. Surface pressure 230 obtained during block 212 of method 200 corresponds to the second flowback period 240B shown in FIG. 4, where surface pressure 230 declines rapidly from approximately 2,900 PSI to near zero or atmospheric, with the duration of second flowback period 240B of block 206 comprising approximately five to fifteen minutes, although, in other embodiments, time durations of block 212 and pressures obtained during the second flowback period 240B may vary. Similar to the effects described above with respect to block 206 of method 200, the reverse flow at block 212 increases spall generation within fractures 152 and 154A (and 156A, if formed) in subterranean formation 10.

Blocks 202-212 of method 200, as illustrated in the attached figures, can be repeated or iterated a second time to provide four total pumping periods (e.g., pumping periods 232A-232D shown in FIG. 4), shut-in periods (e.g., shut-in periods 238A-238C plus an additional shut-in period not shown in FIG. 4), and flowback periods (e.g., flowback periods 240A-240C plus an additional flowback period not shown in FIG. 4). In the subsequent pumping period following block 212 of method 200 (i.e., the second iteration of block 202 of method 200), corresponding to the third pumping period 232C shown in FIG. 4, the composition of a third fracturing fluid employed at the third pumping period 232C is formulated in response a pressure parameter of the first fracturing fluid recorded during the shut-in period of block 204 and a pressure parameter of the second fracturing fluid recorded during the shut-in period of block 210.

The composition of the third fracturing fluid is adjusted depending upon the difference between first and second ISIPs 236A and 236B and/or the slope 272 between shut-in net pressures 274A and 274B. Particularly, if there is a substantial increase in ISIP and a positive slope 272, then a the biodegradable or dissolvable diverting agent included in the third fracturing fluid is adjusted to include far-field biodegradable diverting agents having a smaller mesh size than the near-field diverting agents, and thus, are configured to produce far-field secondary fractures 154B and, possibly, far-field tertiary fractures 156B in the subterranean formation 10. In this embodiment, the far-field biodegradable diverting agent comprises a mesh size of between approximately 30-70 to 70-100 mesh, with approximately 70% of the blend being utilized sized between 70-100 mesh; however, the mesh size and relative amounts used of the far-field biodegradable diverting agent may vary depending on the application and the properties of the subterranean formation. However, if there is only a minor or zero increase in ISIP and only a flat slope 272, then only near-field diverting agents are employed in the third pumping period 232C such that near-field secondary fractures 154B and, possibly, near-field tertiary fractures 156B may be allowed to form.

Thus, unlike the first iteration of block 202 of method 200 (employing the previously described first fracturing fluid), the second iteration of block 202 includes pumping a third fracturing fluid that does not include permanent diverting agents, and instead, includes either near-field diverting agents or a mixture of near-field and far-field diverting agents. However, in other embodiments, permanent diverting agents may be included along with the mixture of near-field and far-field biodegradable diverting agents.

Following the third pumping period 232C as part of the second iteration of method 200 (i.e., the second iteration of block 204 of method 200), well 102 is shut-in, which, in this embodiment, corresponds to the third shut-in period 238C shown in FIG. 4. At this point the third ISIP 238C shown in FIG. 4 and third shut-in net pressure 274C shown in FIG. 5 are recorded and compared with the previously recorded ISIPs 238A and 238B, and shut-in net pressures 274A and 274B. After the shut-in period corresponding to the second iteration of block 204 of method 200, a second iteration of block 206 of method 200 is performed, which, in this embodiment, corresponds with third flowback period 240C shown in FIG. 4.

In this embodiment, following the second iteration of block 206, a second iteration of block 208 of method 200 is performed, corresponding to the fourth pumping period 232D shown in FIG. 4. Similar to the second iteration of block 202, during the second iteration of block 208 the composition of a fourth fracturing fluid pumped into well 102 is adjusted depending upon the increase in ISIP between the second ISIP 236B and the third ISIP 236C, and the slope 272 between shut-in net pressures 274A-274C. Particularly, if there is a substantial increase in ISIP and a positive slope 272, then the biodegradable or dissolvable diverting agent included in the fourth fracturing fluid is adjusted to include a greater amount of far-field biodegradable diverting agents. In this embodiment, if a mixture of near-field and far-field diverting agents was used in the second iteration of block 202 in response to a substantial increase between first ISIP 236A and second ISIP 236B (as well as a positive slope 272 between shut-in net pressures 274A and 274B), then only far-field diverting agents are used in the fourth fracturing fluid pumped into well 102 during the second iteration of block 208; however, in other embodiments, a mixture of near-field and far-field diverting agents may be used with the amount or concentration of far-field diverting agents in the near-field/far-field mixture being increased.

Alternatively, if far-field biodegradable diverting agents were not introduced during the second iteration of block 202 in response to little or no increase from the first ISIP 236A and second ISIP 236B (as well as a flat slope 272 between shut-in net pressures 274A and 274B), then the composition of the fourth fracturing fluid is adjusted by introducing far-field diverting agents in response to the increase between second and third ISIPs 236C and 236D, respectively. Further, if there is only a marginal or no increase between the second ISIP 236B and third ISIP 236C (as well as only a flat slope 272 between second and third shut-in net pressures 274B and 274C), indicating little or no shift in fracture geometry, then the same composition of fourth fracturing fluid employed in the second iteration of block 202 of method 200 is employed in the second iteration of block 208.

In this embodiment, following the second iteration of block 208 of method 200, second iterations of blocks 210 and 212 are completed, at which point a dendritic fracture system, such as the dendritic fracture system 150 shown in FIG. 2, is formed in the subterranean formation 10. In an embodiment, subterranean formation 10 includes multiple production zones extending along the length of well 102, with each zone of formation 10 to be fractured by the hydraulic fracturing system 100 shown in FIG. 1. Thus, in this embodiment, each production zone is individually stimulated or hydraulically fractured by performing two iterations of method 200 as described above and shown in FIGS. 3-5. Although in this embodiment two iterations of method 200 are performed for each zone of the formation 10 to be fractured (in the case of a multi-zone fracturing operation), in other embodiments, varying numbers of iterations of method 200 (including only a single iteration) may be performed on each zone of formation 10 to be fractured.

Although the embodiment of method 200 described above includes separate steps for pumping (i.e., blocks 202 and 208), shut-in (i.e., blocks 204 and 210), and flowback (i.e., blocks 206 and 212), other embodiments need not include each of these elements. For instance, in another embodiment, method 200 does not include blocks 206 and 212, with the well shut-in performed at block 204 directly followed by the pumping performed at block 208 and the well shut-in performed at block 210 directly followed by a second iteration of block 202 (using the third fracturing fluid instead of the first fracturing fluid, as discussed above) in embodiments where multiple iterations of method 200 are performed. In still another embodiment, along with the elimination of blocks 206 and 212, method 200 also does not include shutting in the well 102 at blocks 204 and 210. In this embodiment, instead of ceasing the pumping of fluid and shutting in well 102 at blocks 204 and 210, the flow rate of the first fracturing fluid pumped into well 102 and the subterranean formation 10 is reduced, where the reduced pumping or flow rate at blocks 204 and 210 of this alternate embodiment of method 200 allows for spalls to form in fractures formed in subterranean formation 10.

Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for stimulating a well extending through a subterranean formation, comprising:
   (a) introducing a first fracturing fluid into the subterranean formation, wherein the first fracturing fluid comprises water and a permanent diverter agent;
   (b) shutting in the well for a first period of time following (a);
   (c) flowing back fluid from the well to a surface of the well following (b);
   (d) introducing a second fracturing fluid into the subterranean formation following (c);
   (e) shutting in the well for a second period of time following (d);

(f) flowing back fluid from the well to a surface of the well following (e);
(g) recording a first pressure parameter of the first fracturing fluid during (b);
(h) recording a second pressure parameter of the second fracturing fluid during (e); and
(i) adjusting a composition of third fracturing fluid in response to a difference between the recorded first pressure parameter and recorded second pressure parameter.

2. The method of claim 1, wherein the second fracture fluid has a different composition than the first fracturing fluid, wherein the second fracturing fluid comprises a temporary diverting agent.

3. The method of claim 2, wherein the temporary diverting agent of the second fracturing fluid is configured to dissolve in-situ.

4. The method of claim 2, further comprising:
introducing the third fracturing fluid into the subterranean formation wherein the third fracturing fluid is different in composition from both the first fracturing fluid and the second fracturing fluid, and wherein the third fracturing fluid comprises a temporary diverting agent.

5. The method of claim 4, wherein:
the second fracturing fluid comprises a near-field diverting agent; and
the third fracturing fluid comprises a far-field diverting agent.

6. The method of claim 2, further comprising:
forming a primary fracture extending into the subterranean formation from a surface of the well in response to (a); and
forming a secondary fracture extending into the subterranean formation from the primary fracture in response to (d).

7. The method of claim 1, wherein:
the first pressure parameter comprises a net pressure of the first fracturing fluid corresponding to the difference between an instantaneous shut-in pressure (ISIP) of the first fracturing fluid and in-situ stress of the subterranean formation; and
the second pressure parameter comprises a net pressure of the second fracturing fluid corresponding to the difference between an ISIP of the second fracturing fluid and in-situ stress of the subterranean formation.

8. The method of claim 1, further comprising:
(j) introducing the third fracturing fluid into the subterranean formation;
(k) shutting in the well for a third period of time following (j);
(l) recording a third pressure parameter of the third fracturing fluid during (k); and
(m) forming a composition of a fourth fracturing fluid in response to the recorded third pressure parameter and fourth pressure parameter.

9. The method of claim 1, further comprising:
including a temporary diverting agent in the composition of the third fracturing fluid in response to a difference between the first pressure parameter and the second pressure parameter.

10. The method of claim 1, further comprising:
maintaining the same composition of the second fracturing fluid and first fracturing fluid in response to an equivalence between the first pressure parameter and the second pressure parameter.

11. The method of claim 1, wherein the second fracturing fluid comprises a temporary diverting agent not included in the first fracturing fluid.

12. The method of claim 1, further comprising:
monitoring the volume of fluid flowed back to the surface of the well during (c); and
monitoring the volume of fluid flowed back to the surface of the well during (f).

13. The method of claim 1, further comprising:
monitoring a pressure of the first fracturing fluid during (b); and
monitoring a pressure of the second fracturing fluid during (e).

14. The method of claim 1, further comprising:
forming a primary fracture in the subterranean formation extending from a surface of the well during (a);
forming spalling on a fracture face of the primary fracture during (c); and
bridging off the primary fracture during (d) with a temporary diverting agent included in the second fracturing fluid.

15. The method of claim 1, wherein:
the first pressure parameter comprises an instantaneous shut-in pressure (ISIP) of the first fracturing fluid; and
the second pressure parameter comprises an ISIP of the second fracturing fluid.

* * * * *